United States Patent
Coon et al.

[11] Patent Number: 5,949,616
[45] Date of Patent: Sep. 7, 1999

[54] SUSPENSION HAVING RELIEF AGAINST FLEXURE MOVEMENT INTERFERENCE

[75] Inventors: Warren Coon; Aman Khan, both of Temecula, Calif.

[73] Assignee: Magnecomp Corp., Temecula, Calif.

[21] Appl. No.: 08/872,261

[22] Filed: Jun. 10, 1997

Related U.S. Application Data

[60] Provisional application No. 60/046,732, May 16, 1997.
[51] Int. Cl.$^6$ ........................................................ G11B 5/48
[52] U.S. Cl. ............................................................. 360/104
[58] Field of Search .................................... 360/104, 105, 360/107

[56] References Cited

U.S. PATENT DOCUMENTS

| | | | |
|---|---|---|---|
| 5,198,945 | 3/1993 | Blaeser et al. | 360/104 |
| 5,291,359 | 3/1994 | Wolter | 360/104 |
| 5,377,064 | 12/1994 | Yaginuma et al. | 360/104 |
| 5,446,611 | 8/1995 | Webber | 360/104 |
| 5,608,590 | 3/1997 | Ziegler et al. | 360/104 |

*Primary Examiner*—George J. Letscher
*Attorney, Agent, or Firm*—Louis J. Bachand

[57] ABSTRACT

Extended arcuate travel of the flexure in a disk drive suspension head gimbal assembly is provided by reducing the load beam body thickness in the areas where the load beam body normally interferes with full arc traverse, by etching some or all of the load beam material away in the interference areas.

5 Claims, 2 Drawing Sheets

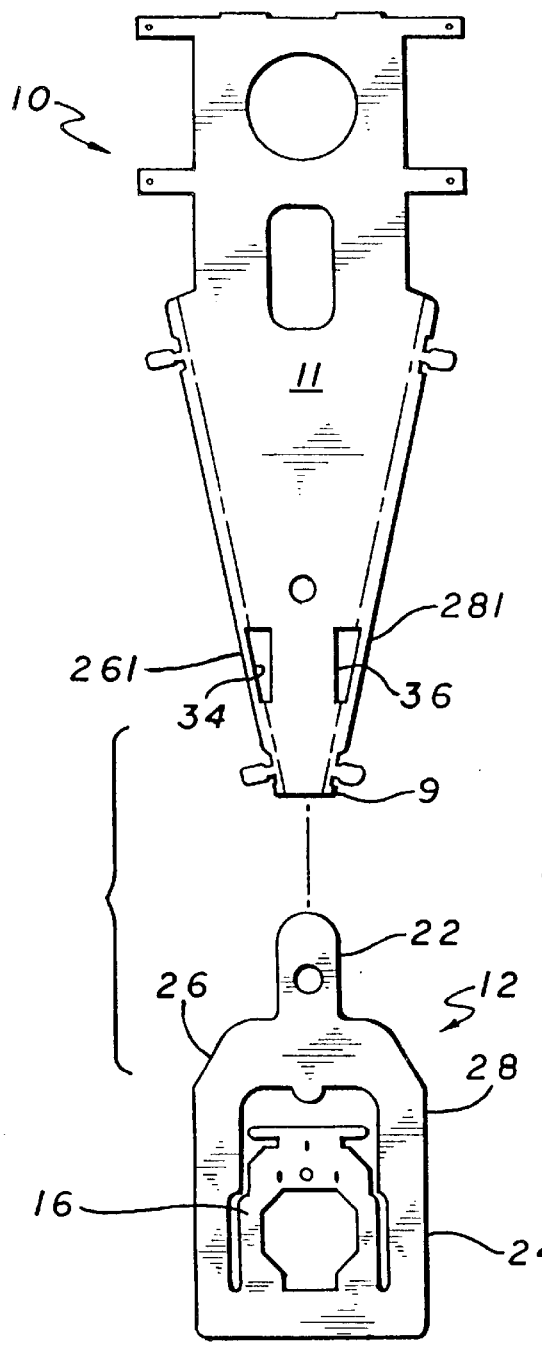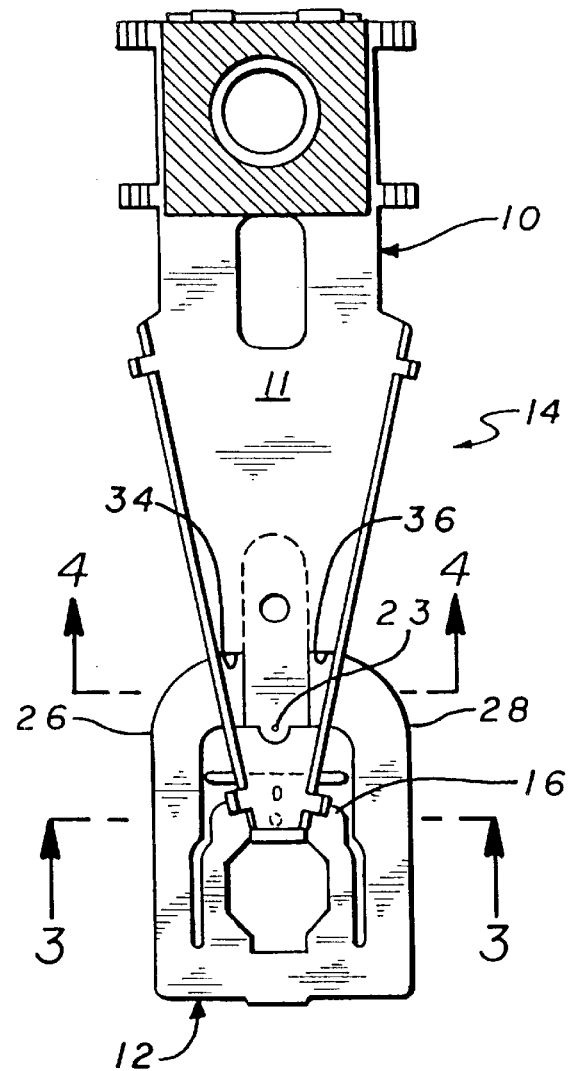

SUSPENSION HAVING RELIEF AGAINST FLEXURE MOVEMENT INTERFERENCE

REFERENCE TO RELATED APPLICATION

This application claims the benefit of U.S. Provisional Patent Application No. 60/046,732, filed May 16, 1997.

BACKGROUND OF THE INVENTION

This invention has to do with disk drive suspensions, and more particularly with improvements in the design and manufacture of load beams used in conjunction with flexures in such disk drive suspensions. Typically, the flexure carries the head for close positioning at the disk surface. To do so the flexure must gimbal, i.e. rotate universally, about some point on the load beam. Many desirable load beam and flexure designs have relatively a size or configuration which makes likely an interference contact between the flexure outboard edges or their edge margins with the load beam in the course of traversing a normal arc of rotation about a flexure axis. The abrupt stopping of the flexure by the interfering contact is inimical to accurate travel of the slider and its head over the disk surface.

BRIEF SUMMARY OF THE INVENTION

It is accordingly an object of the invention to provide greater flexibility in flexure and load beam design. It is a further object to provide a method for the design and manufacture of suspensions in which the contact interference between flexure and load beam is obviated by modification of the load beam to allow a full travel arc for the flexure. It is a still further object of the invention to provide suspension assemblies in which the flexure and load beam are free of interference in flexure travel.

These and other objects of the invention to become apparent hereinafter are realized in a disk drive suspension head gimbal assembly for positioning a head at a disk, the assembly comprising a load beam and flexure unit including a flexure central tongue for supporting the head adjacent the disk, the flexure comprising a portion fixed to the load beam and a cantilevered portion having left and right lateral extents extending laterally of the load beam, the flexure cantilevered portion carrying the flexure tongue and adapted for rotation in predetermined arcs about its axes relative to the load beam in head positioning relation, the load beam normally tending to interfere with flexure portion rotation of its the lateral extents along the predetermined arcs, the load beam being locally relieved at each locus of interference to permit flexure portion rotation throughout its the predetermined arcs free of load beam interference.

In more particular embodiments, the load beam comprises an elongated body of a given thickness, the load beam body being apertured through the thickness at each the locus of interference; the load beam comprises an elongated body of a given thickness, the load beam body being reduced in thickness at each the locus of interference less than through the thickness but sufficiently to permit the flexure portion rotation throughout its the predetermined arcs; the load beam is generally planar and tapers in width toward its distal end, the flexure cantilevered portion having a greater width than the load beam distal end and tapering oppositely to the load beam distal end; the load beam comprises an elongated body of a given thickness, the load beam body being apertured through the thickness at each the locus of interference; the load beam body is selectively apertured by etching through the load beam body locally; the load beam body aperturing is generally triangular in shape and tapered in the same direction as the load beam body is tapered; or, the load beam comprises an elongated body of a given thickness, the load beam body being reduced in thickness at each locus of interference, less than through the thickness but sufficiently to permit flexure portion rotation throughout its predetermined arcs; the load beam body is selectively reduced in thickness by etching the body locally, and the load beam body has longitudinal edge rails extending away from the flexure, the load beam body being selectively etched at least at the edge rail corner.

BRIEF DESCRIPTION OF THE DRAWINGS

The invention will be further described in conjunction with the attached drawings in which:

FIG. 1 is a plan view of the invention disk drive suspension head gimbal assembly load beam and flexure unit, disassembled;

FIG. 2 is a plan view thereof, assembled;

DETAILED DESCRIPTION OF THE INVENTION

Figure 3:
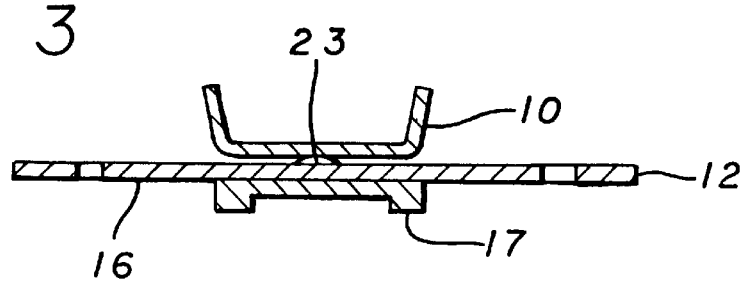
FIG. 3 is a view taken on line 3—3 in FIG. 2.

Conventional suspension assemblies provide gimbaling capability to their associated sliders to allow for a small range of rotational movement about the pitch and roll axes so that the slider can follow the waves of the disk and also allow for some tolerance build up in the head stack assembly that might result in the HGA (head gimbal assembly-the slider and suspension assembled together) being installed at a vertical distance from the disk that is different from the ideal design value. For conventional HGAs, this rotational movement is approximately one degree of angular stroke from the nominal position. The freedom of movement of the flexure must not be abruptly limited by contact with any feature of the suspension or the slider will not correctly comply with the disk surface.

Conventional suspensions become problematic when used with loadable drives, removable media drives, or flexible media drives for two reasons:

1. The angular stroke requirement increases when the suspension must be lifted off the disk as it is in all loadable and removable drives.

2. The disk (media) surface that the slider is supposed to follow along with (compliance) is by definition not a rigid surface with a fixed shape, so the slider must comply with a surface that is changing its form from flat and level to pitch up and down and roll left and right and translate up and down in all combinations. This lack of control of the surface that the slider must follow increases the angular stoke requirement placed on the suspension beyond what a conventional suspension can supply.

There is a third application in which the conventional suspension cannot supply the required characteristics, and that is the optical or combined optical and magnetic head, which uses a lens on the slider to read data via a laser. This lens is an additional feature on the slider which results in the flexure being enlarged to provide clearance around the lens. The enlargement of the flexure, in turn, means that the flexure is more likely to physically interfere with the other parts of the suspension at a given angular displacement from nominal, or will interfere at a smaller angle.

In the invention suspension design the load beam has etched holes where the load beam and flexure would contact. The movement of the slider is thus not restricted by the flexure contacting the load beam. This results in an increase in available angular stroke in both the pitch and roll directions.

Where the full increase in available stroke is not required, the load beam may be partially etched to form a recessed area, rather than completely etched through. Accordingly, etch depths in the invention are from greater than 0% (recess etching) up to 100% (through hole etching).

With reference now to the drawings in detail, in FIGS. 1–5, the invention disk drive suspension head gimbal assembly for positioning a head at a disk shown to comprise a load beam 10 and flexure 12 shown as a unit 14 in FIG. 2. Load beam 10 is generally planar and tapers in width toward its distal end 9. Flexure 12 is typically at least partially greater in width than load beam distal end 9 and tapers oppositely to the load beam distal end. Flexure 12 further includes a flexure central tongue 16 for supporting the head slider 17 (FIG. 3) adjacent the disk (not shown). The flexure 12 has a first portion 22 fixed by welding at 23 to the load beam 10, a cantilevered second portion 24, and left and right lateral extents 26, 28 respectively, extending laterally of the load beam. The flexure cantilevered portion 24 carries the flexure tongue 16 and rotates in predetermined arcs about its pitch and roll and other axes relative to said load beam to position the head slider 17.

The load beam 10 will normally tend to interfere with rotation of the relatively wider cantilevered flexure portion 24 by contact with the flexure portion lateral extents 26, 28 in their traverse along their predetermined arcs, predetermined by the positioning and movement of the flexure 12 in the unit 14. To avoid contacting the lateral extents 26, 28, the load beam 10 is locally relieved at each prospective locus of interference 261, 281, respectively, to permit flexure portion 24 rotation throughout each predetermined arcs free of load beam interference.

Figure 3A:
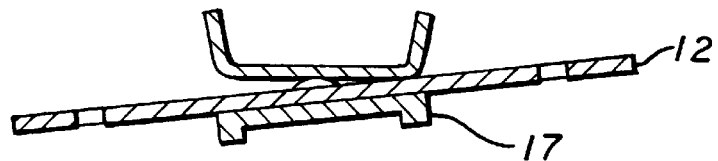
FIG. 3A is a view like FIG. 3, but showing the arcuate travel of the flexure.

With reference particularly to FIGS. 3 and 3A, the flexure first portion 22 while fixed to the load beam 10 at 23 will shift up and down, and twist on its axes in gimbaling on the dimple 32. An illustrative rotation of the flexure 12 about the flexure longitudinal axis is shown in comparing FIGS. 3 and 3A. It will be noted that the flexure first portion 22 does not in its arc of rotation interfere with the load beam 10, that is, the flexure first portion 22 does not enter the space occupied by the load beam.

Figure 4:
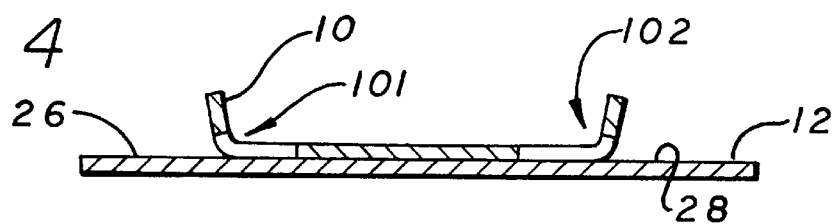
FIG. 4 is a view taken on line 4—4 in FIG. 2.
Figure 4A:
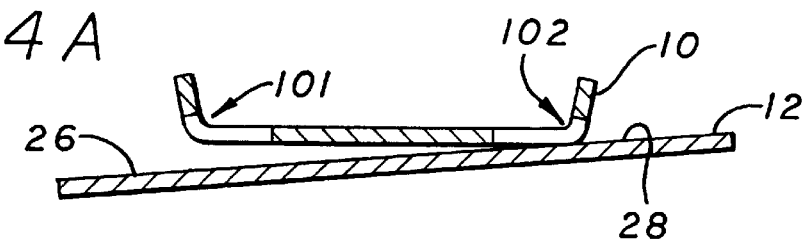
FIG. 4A is a like FIG. 4, but showing the arcuate travel of the flexure.

With reference to FIGS. 4 and 4A, where the flexure cantilevered portion 24 has the same or a greater degree of angular movement in its rotation as the fixed portion 22, and the load beam 10 taper is less so that the load beam width extends over relatively more of the flexure 12, a mechanical interference may occur between the flexure lateral extents 26, 28 and the opposing load beam areas 101, 102 if they try to occupy the same physical space, such space being termed herein a locus of interference. Typically, the load beam 10 comprises an elongated body 11 of a given thickness, and in the invention the load beam body is apertured completely through that thickness at each locus of interference forming holes or apertures 34, 36. These generally triangular or quadrilateral openings are sized and located, as shown, to permit the flexure lateral extents 26, 28 to enter the plane of the load beam 10 and not be contacted or interfered with by the load beam.

Figure 5:
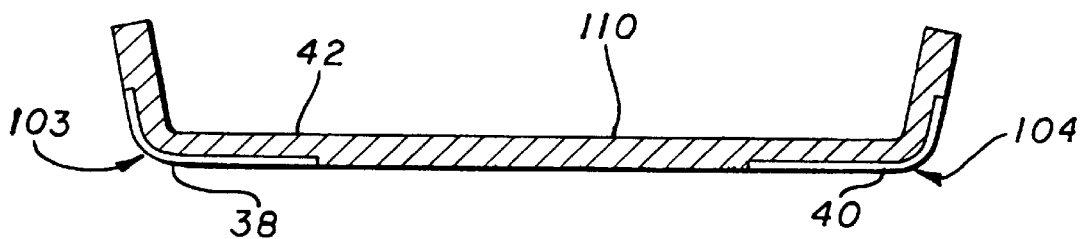
FIG. 5 is a view in cross-section of a load beam with only partial not through etch of the load beam body.

With particular reference to FIG. 5, where the locus of interference is quite small, a simple recess formation will be enough to prevent contact and interference between the flexure lateral extents 26, 28 and the load beam 10. Thus, the load beam 110 has elongated body 42 of a given thickness and it is reduced in thickness at areas 103, 104 defining each prospective locus of interference less than through said thickness but sufficiently to permit flexure rotation throughout its intended arcs forming wraparound recesses 38, 40.

The reduction in thickness of the load beam by a factor of from above 0% to 100% is preferably accomplished by etching the load beam body in the course of its fabrication, e.g. with known etchants for stainless steel. Other forms of fabrication of the relieved areas will also be satisfactory in certain circumstances.

The invention thus provides greater flexibility in flexure and load beam design, a method for the design and manufacture of suspensions in which the contact interference between flexure and load beam is obviated by modification of the load beam to allow a full travel arc for the flexure, and a flexure and load beam assembly free of interference in flexure travel. The foregoing objects of the invention are thus met.

We claim:

1. A disk drive suspension head gimbal assembly for positioning a head at a disk, said assembly comprising an elongated load beam of a given thickness, and a flexure unit including a flexure central tongue for supporting the head adjacent the disk, said flexure lying in a separate plane from said load beam and comprising a portion fixed to said load beam and a cantilevered portion having left and right lateral extents extending laterally of said load beam, said flexure cantilevered portion carrying said flexure tongue and adapted for rotation in predetermined arcs about its axes relative to said load beam in head positioning relation, said load beam normally tending to interfere with flexure portion rotation of its said lateral extents along said predetermined arcs, said load beam being apertured through its said thickness at each locus of interference to permit flexure portion rotation throughout its said predetermined arcs free of load beam interference.

2. The disk drive suspension head gimbal assembly according to claim 1, in which said load beam comprises an elongated body of a given thickness, said load beam body being reduced in thickness at each said locus of interference less than through said thickness but sufficiently to permit said flexure portion rotation throughout its said predetermined arcs.

3. The disk drive suspension head gimbal assembly according to claim 1, in which said load beam is generally planar and tapers in width toward its distal end, said flexure cantilevered portion tapering to a greater width than said load beam distal end and tapering oppositely to said load beam distal end.

4. The disk drive suspension head gimbal assembly according to claim 1, in which said load beam body is selectively apertured by etching through said load beam body locally.

5. The disk drive suspension head gimbal assembly according to claim 4, in which said load beam body aperturing is generally triangular in shape and tapered in the same direction as said load beam body is tapered.

* * * * *